(12) United States Patent
Rubin de la Borbolla

(10) Patent No.: US 7,151,220 B1
(45) Date of Patent: Dec. 19, 2006

(54) FAST SET SCREW DEVICE FOR NON-METALLIC BOXES

(75) Inventor: Ian Rubin de la Borbolla, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/479,531

(22) Filed: Jun. 30, 2006

Related U.S. Application Data

(60) Provisional application No. 60/697,664, filed on Jul. 8, 2005.

(51) Int. Cl.
*H01H 9/02* (2006.01)

(52) U.S. Cl. ............ 174/58; 174/53; 174/57; 174/60; 361/600; 248/906; 439/535

(58) Field of Classification Search ........ 174/57–58, 174/63, 53, 60; 220/3.9, 3.92, 3.2, 3.3; 248/906, 900; 439/535; 361/600
See application file for complete search history.

(56) References Cited

U.S. PATENT DOCUMENTS

| | | | |
|---|---|---|---|
| 1,927,780 A | 9/1933 | Anderson | |
| 2,364,668 A | 12/1944 | Simmons | |
| 2,720,135 A | 10/1955 | Gisondi | |
| 3,210,458 A | 10/1965 | Palmer | |
| 3,352,341 A | 11/1967 | Schertz | |
| 3,426,321 A | 2/1969 | Peterson, Jr. | |
| 3,472,303 A | 10/1969 | Beard | |
| 3,526,703 A | 9/1970 | Tucker | |
| 3,895,732 A | 7/1975 | Robinson et al. | |
| 4,105,862 A | 8/1978 | Hoehn | |
| 4,130,335 A | 12/1978 | Kinney | |
| 4,188,854 A | 2/1980 | Hoehn | |
| 4,281,773 A | 8/1981 | Mengeu | |
| 4,311,422 A | 1/1982 | Jackovitz | |
| 4,315,100 A | 2/1982 | Haslbeck et al. | |
| 4,355,198 A | 10/1982 | Gartland, Jr. | |
| 4,642,420 A | 2/1987 | Nattel | |
| 4,983,785 A * | 1/1991 | Johnston | 174/53 |
| 5,057,649 A | 10/1991 | Ring | |
| 5,170,013 A | 12/1992 | Borsh et al. | |
| 5,170,014 A | 12/1992 | Borsh | |
| 5,511,301 A | 4/1996 | McGuire | |
| 5,524,330 A | 6/1996 | Alberini | |
| 5,753,858 A | 5/1998 | Eder et al. | |
| 5,831,213 A | 11/1998 | Wright et al. | |
| 5,833,110 A | 11/1998 | Chandler et al. | |
| RE36,164 E | 3/1999 | Johnson et al. | |

(Continued)

*Primary Examiner*—Dhiru R. Patel
(74) *Attorney, Agent, or Firm*—Hoffmann & Baron, LLP

(57) ABSTRACT

A non-metallic electrical wiring box having a fast set screw mounting socket for mounting electrical devices inside the box. The box includes a pair of side walls, a pair of end walls, a back wall, a front opening and one or more fast set screw mounting sockets in each end wall, or connected to each end wall, for receiving a mounting screw. Each socket includes: a socket wall, preferably a cylindrically-shaped wall, an interior wall surface, a first end, a second end and a mid-region. The first end corresponds to the front opening of the box and the mid-region is between the first and second ends of the fast set screw mounting socket. Each socket also has a center slot in the socket wall, which preferably bisects the socket wall and extends from about the mid-region to the second end of the socket and defines two or more flexible socket wall sections.

20 Claims, 7 Drawing Sheets

U.S. PATENT DOCUMENTS

| | | |
|---|---|---|
| 6,023,021 A | 2/2000 | Matthews et al. |
| 6,227,783 B1 | 5/2001 | Salameh |
| 6,369,323 B1 | 4/2002 | Wright |
| 6,379,093 B1 | 4/2002 | Bondarowicz et al. |
| 6,612,796 B1 | 9/2003 | Gattone |
| 6,727,428 B1 | 4/2004 | Archer et al. |
| 6,737,576 B1 | 5/2004 | Dinh |
| 6,808,079 B1 | 10/2004 | Lalancette et al. |
| 6,894,222 B1 | 5/2005 | Lalancette et al. |

\* cited by examiner

FAST SET SCREW DEVICE FOR NON-METALLIC BOXES

This application claims priority from provisional application Ser. No. 60/697,664, filed on Jul. 8, 2005.

FIELD OF THE INVENTION

The present invention relates to electrical outlet or junction boxes and more specifically to a box with a mounting feature for quickly and easily installing electrical devices in the box.

BACKGROUND OF INVENTION

An electrical junction or outlet box provides an enclosure for an electrical device, such as a receptacle, as well as a termination point for wires carrying electrical current through buildings, houses and other structures. Wiring entering an outlet box is typically connected to a particular electrical fixture or receptacle such as a plug outlet or switch. The box is then typically covered by a face plate having an opening therein to allow access to the outlet or switch while preventing electrified components from being exposed. Outlet boxes may be employed in concealed-wiring installations in which they are located within a wall or ceiling. In such applications, outlet boxes are typically secured to structural members such as wall studs or ceiling joists in order to provide support for the box. The support member must be able to withstand forces imparted onto the box and prevent movement of the box under situations such as the repeated insertion and removal of a plug. Alternatively, outlet boxes may be used in exposed-conduit wiring installations where they are exteriorly mounted to a wall, column or ceiling.

Outlet boxes are available in a variety of configurations and sizes. The selection of a box is dependant upon the specifics of the application. Outlet boxes typically include a plurality of openings which provide entry for the wires into the box. These openings are usually covered by removable portions called "knockouts" which can be easily removed by the installer as required. With most electrical fixtures, the outlet box is spacious enough to accommodate sufficient lengths of excess wiring to allow a connected fixture to be removed from the outlet box and serviced without disconnecting the fixture from the wiring.

The most commonly employed outlet box is a single-gang outlet box, also referred to as a standard outlet box. The single-gang box is ideal for applications in which only one receptacle is required for the application. Standard outlet boxes have opening dimensions of approximately 3"×2¼" and are available in a variety of depths. Double-gang and triple-gang boxes are also available, and they, typically, have the capacity to hold two and three receptacles, respectively. A four inch (4") square box is also commonly employed for multiple receptacle applications.

In almost all outlet box designs, electrical devices are attached to the boxes by means of screws. The boxes typically have mounting apertures with female threaded portions located at opposite ends of the box. The electrical device that is to be mounted in the box has a pair of mounting brackets extending on each end of the device with a mounting screw aperture. The device is positioned within the box so that the apertures correspond to the female threaded portions and a mounting screw is inserted through the aperture in the device and into the opening in the corresponding female threaded portion. The screws engage the female threaded portions of the box and are tightened by rotation to secure the device in the box.

To install an electrical fixture such as a receptacle or switch, an installer pulls one end of an electrical wire or cable, through a knockout opening in the box. An excess length of wire is pulled through the knockout allowing for the electrical fixture to be attached to the wire at a location outside the outlet box where the installer has more room to work. The end of the wire is then connected to the terminals of the electrical fixture and the fixture is positioned in the box with the excess wire packed into the box behind the fixture. The installer then holds the fixture in place with one hand while inserting and tightening two mounting screws to secure the fixture to the box.

The methods previously used for installing electrical devices in non-metallic junction boxes with mounting screws fall into two categories—"quick set" and "manual threading." For the manual threading method, the screws are turned, allowing the threads to dig into the plastic mounting sockets of the box. For the quick set method, the screws are simply pushed into the mounting sockets (usually with a screwdriver or similar tool) and secured in place by various retaining devices. One such device is a metal clip that is inserted inside the socket. The clip has a metal barb that pushes against the threads of the screw with a force opposite to the direction of the insertion. The clip allows the screw to be inserted, but resists extraction of the screw. If the screw begins to loosen or separate, the barb pushes deeper into the thread of the screw and provides an opposing force.

Another retaining device is a separate wedge with internal threads located inside a pocket formed by the screw hole of the junction box. The screw is inserted and the wedge engages the threads of the screw. As the screw is tightened and engages the retaining device, the opposing force created by the wedge increases and pinches the screw threads. However, both of these types of retaining devices have disadvantages. The manual threading devices still require the user to thread the entire screw length and the fast set devices have multiple components which require assembly when manufactured.

Accordingly, it is desirable to provide an electrical outlet box having mounting screw apertures integrally formed with the box which allow the installer to secure the electrical fixture in the box quickly and easily, saving time and money.

SUMMARY OF THE INVENTION

In accordance with the present invention, a non-metallic electrical wiring box having a fast set screw mounting socket for mounting electrical devices is provided. The box includes a pair of side walls, a pair of end walls, a back wall, a front opening and one or more fast set screw mounting sockets in each end wall, or connected to each end wall, for receiving a mounting screw. Each socket includes: a socket wall, preferably a cylindrically-shaped wall, an interior wall surface, a first end, a second end and a mid-region. The first end corresponds to the front opening of the box and the mid-region is between the first and second ends of the fast set screw mounting socket. Each socket also has a center slot in the socket wall, which preferably bisects the socket wall and extends from about the mid-region to the second end of the socket and defines two flexible socket wall sections.

The first end of the mounting socket receives a mounting screw having threads and the flexible socket wall sections flexibly accommodate the screw. In some embodiments, the diameter of the first end of the fast set screw mounting socket is greater than the diameter of the second end.

Preferably, the fast set screw mounting sockets are at least partially tapered toward the second end and the interior wall surface of the socket is substantially smooth. However, in other embodiments, a plurality of grooves (also referred to herein as grooved rings) are formed in the interior wall surface of the mounting socket.

The box can also include a pair of side slots in each end wall, which are located so that the fast set screw mounting socket is disposed between the side slots. Preferably, the side slots are substantially parallel to the center slot in the socket wall and extend from about the mid-region to the second end of the mounting socket. In preferred embodiments, the second end of each socket is defined by a slit in the end wall. The slit extends between the side slots and is substantially perpendicular to the center slot and substantially parallel to the front opening. In some embodiments, the pair of side slots and the wall sections of the socket define a pair of tabs that are connected to the end wall by a pair of hinge sections. The tabs and hinge sections provide added flexibility to the socket wall sections and allow the wall sections to move outwardly when a screw is inserted in the fast set screw mounting socket.

The end walls of the box have interior sides and the fast set screw mounting sockets are connected to the interior surfaces, either integrally or separably. In other embodiments, the sockets are substantially bisected by the end wall or extend outwardly from the exterior sides of the end walls. In the most preferred embodiments, the sockets are integrally formed in or on the end walls when the box is made by an extrusion, a casting or an injection molding process.

BRIEF DESCRIPTION OF THE FIGURES

The preferred embodiments of the outlet box of the present invention, as well as other objects, features and advantages of this invention, will be apparent from the following detailed description when considered in connection with the accompanying drawings wherein.

DETAILED DESCRIPTION OF THE INVENTION

Figure 1:
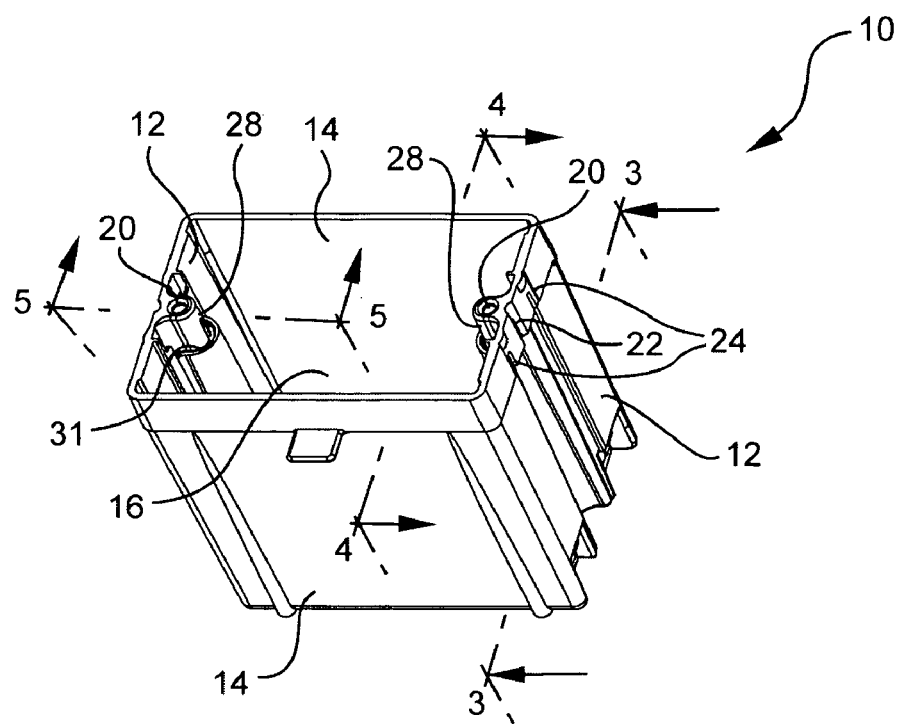
FIG. 1 is a perspective view of the junction box.

The present invention is an electrical junction box with fast set screw mounting sockets for installing electrical devices in the box. The fast set screw mounting sockets allow the user to install an electrical device, such as a receptacle, into a single or multi gang box without having to manually thread the mounting screws into the box or use power tools. The electrical junction box of the present invention allows a device to be installed by simply placing the device in the box, aligning the mounting apertures of the device with the fast set screw mounting sockets of the box and pushing the mounting screws into the sockets. Optionally, the user can still turn the mounting screws a couple of twists to engage the threads of the screw with the interior walls of the socket, if mounting the traditional way is desired.

The fast set screw mounting sockets have a first end, which corresponds to the front opening of the box, a second or rear end and a mid-region, which is located between the first and second ends. The sockets also have a slot which extends from about the mid-region to the second end of the socket. Preferably, the slot bisects the walls of the socket and forms at least two wall sections. The second end of the socket is defined by a slit in the end wall that is substantially perpendicular to the slot and substantially parallel to the plane formed by the front opening of the box.

The sockets maintain the position of the inserted screws using a "pre-load" (also referred to herein as a "fast-set") which applies a force to the threads of the screws after the screws are inserted in the sockets. In a preferred embodiment, the mounting screw socket has an interior wall that tapers inwardly from the mid-region towards the second (i.e. rear) end of the socket and multiple areas of relief formed by the wall sections that extend in a parallel direction to the screw's axis of travel. As used herein, the term taper means a gradual decrease in diameter of the socket, either from the front end to the rear or from the mid-region to the rear. In addition to the slot that extends through the wall of the fast set screw mounting socket, a pair of side slots are located in the end wall of the outlet box, one on either side of the mounting socket. The side slots extend parallel to the socket from about the mid-region of the socket to the slit and provide additional flexibility for the wall sections of the socket. A pair of tabs in the end wall are defined by the pair of slots on either side of the socket.

Preferably, the slot in the socket wall extends through the opposing sides of the fast set screw mounting socket, approximately perpendicular to the surface of the end wall, and define at least two wall sections. In other embodiments, the socket can have more than one slot. Preferably, the slot in the socket is the same length or slightly longer than the pair of side slots. The side slots provide areas of relief in the end wall so that the tapered rear end of the fast set screw mounting socket can flex outwardly as a screw is inserted into the mounting socket. A screw cannot be easily extracted from the socket because the flexible wall sections engage the threads of the screw after the screw is inserted in the socket. The interior walls of the socket resist the extraction of the screw by pressing against the threads of the screw with an equal and opposite force corresponding to the force being applied to remove the screw. However, the screw can be easily removed or extracted from the mounting socket by simply unscrewing it.

The fast set screw mounting sockets allow an installer to simply push the mounting screws for an electrical device into the mounting sockets in the box without having to rotate the screws. Hence, the electrical device (whether a duplex receptacle, GFCI, switch, etc.) can be quickly and easily installed by a simple pushing motion. However, once installed, the screws are securely held in place by the fast set screw mounting sockets.

Similar designs exist, but most designs require a separate piece, such as a metal clip or a wedge, that must be assembled with the box. In contrast, the box of the present invention is a single unitary structure with no additional components which require an additional step during manufacture or post-manufacturing assembly. Preferably, the electrical utility box with the fast set screw mounting sockets is formed using a molding process well known to those skilled in the art. The box can comprise a thermoplastic material, elastic synthetic polyamide material (Nylon), a polycarbonate, an acrylonitrile-butadiene styrene, a polyester terephthalate or a styrene-acrylonitrile. The preferred thermoplastic material is a polyethylene, polypropylene or polybutylene. The box is formed using methods well known to those skilled in the art of such products, preferably by an extrusion, a casting or an injection molding process.

As indicated above, the second end of the fast set screw mounting sockets are preferably tapered inwardly with at least one slot extending from the mid-region to the second (rear) end to form two or more wall sections. The slot in the socket and the side slots in the end wall provide flexibility so that the wall sections of the mounting socket can flex or move outwardly upon insertion of a screw. The inherent bias of these wall sections of the mounting socket is against the threads of the screw so that if an attempt is made to withdraw the screw without rotating it, the screw becomes wedged in place. The fast set screw mounting sockets work in a manner similar to a Chinese finger pull. The finger goes in and expands the finger pull device, but the bias of the device on the finger prevents the finger from being pulled out. In a similar fashion, the screw goes into the tapered fast set screw mounting socket and is biased by the flexible wall sections of the socket so that the wall sections resist any attempt to extract the screw. One skilled in the art can see the ready application of this invention in that the installer need only push the receptacle into the box, no threading or screwing is required. Yet, if the receptacle is to be removed, such can be done in the normal fashion and its replacement would simply be pushed in much the same as the original device was installed.

The outlet box, and more particularly the end walls of the outlet box with the mounting socket, is of one piece all plastic construction. However, if desired, the box can be constructed of multiple parts assembled together. The advantage of one-piece, all plastic construction is the savings in manufacturing cost. The completed box can be manufactured in a single molding operation with no downstream assembly involving additional components other than what may be used for securing the box to a structural support member. However, if the component used for securing the box to a structural support member is made from a plastic, it can be molded with the box.

The different features of the present invention are illustrated in the accompanying drawings. Referring to FIGS. 1–8, there is shown a preferred embodiment of the non-metallic outlet box 10 that includes a pair of end walls 12, a pair of side walls 14, a front opening 16, a back wall 18 and a fast set screw mounting socket 20 in each end wall 12. These figures illustrate an embodiment wherein a fast set screw mounting socket 20 is located on the interior surface of each of the opposing end walls 12 of the box 10. Each socket 20 has a first or front end 17 that corresponds to the front opening 16 of the box 10, a second or rear end 21, a mid-region 19 between the first end 17 and the second end 21 (see FIG. 5) and a cylindrically-shaped wall 27. The cylindrically-shaped wall 27 has a slot 22 therethrough, which extends from the mid-region 19 of the socket 20 to the second/rear end 21 to form two wall sections 28. A pair of side slots 24 are located in each end wall 12, one side slot 24 on either side of the mounting socket 20. The second or rear end 21 of the socket 20 is defined by a slit 31 which is substantially perpendicular to the side slot 24 and substantially parallel to the plane formed by the front opening of the box.

Figure 2:
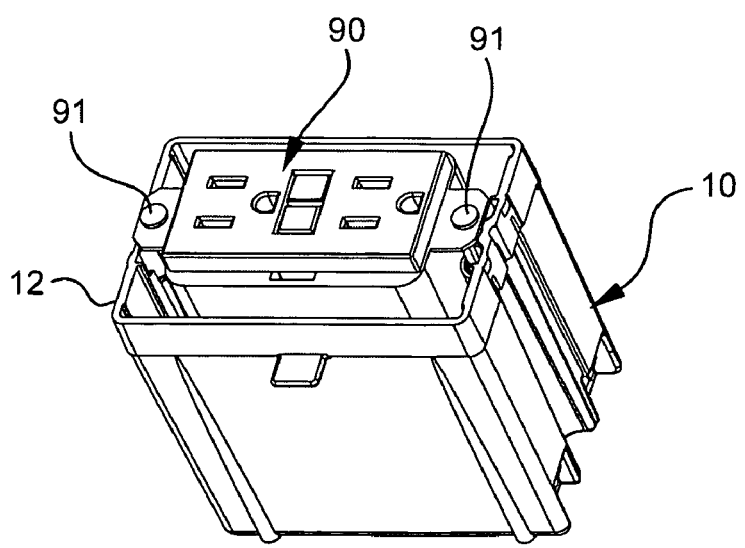
FIG. 2 is a perspective view of the junction box with a GFCI receptacle mounted in the box.

FIG. 2 shows an outlet box 10 with a GFCI receptacle 90 mounted in the box 10. The box 10 can be secured to a wood or metal stud, sheetrock, plywood or any other material in the normal fashion for such material using nails, screws, brackets or the other fasteners. Box 10 can be mounted in the floor, wall or ceiling of a structure. The GFCI receptacle 90 has a pair of mounting screw apertures 91 at the opposing ends which correspond to the fast set screw mounting sockets 20 of the outlet box 10. Receptacle 90 is a GFCI receptacle, but other devices can also be mounted in the outlet box 10, such as a standard duplex receptacle, a toggle switch or even a low voltage device. The only requirement is that the receptacle 90 has mounting screw apertures 91 which are suitable for mounting the receptacle 90 in a box 10.

The typical receptacle 90 is generally provided with mounting screw apertures 91 at opposing ends. The receptacle 90 is secured to a box 10 by passing mounting screws 92 through the mounting screw apertures 91 and threading them into mating mounting screw sockets 20 in the box 10 (see FIGS. 10–12). While it does not take a considerable amount of time to fasten the receptacle 90 in this fashion, it still requires some effort on the part of the installer. Thus, if the time to secure receptacle 90 to box 10 can be reduced, the installer will then have more time for other tasks or to install other boxes and/or receptacles. Hence, the boxes of the present invention with fast set screw mounting sockets 20 increase productivity and decrease costs.

With receptacle 90 positioned on box 10 as shown in FIG. 2, all the installer needs to do to complete the installation is simply push the two together. No threading of screws 92 is required. In some cases, a simple push on receptacle 90 will suffice, but in other cases, it may be desirable for the user to directly push screws 92 into mounting sockets 20 using a hand or power tool. In this latter situation, the tool tip will need to be either aligned with the slot or slots in the head of the screw 92 or fitted over the top of the head of the screw 92, an action that is already required under normal installation procedures.

Figure 3:
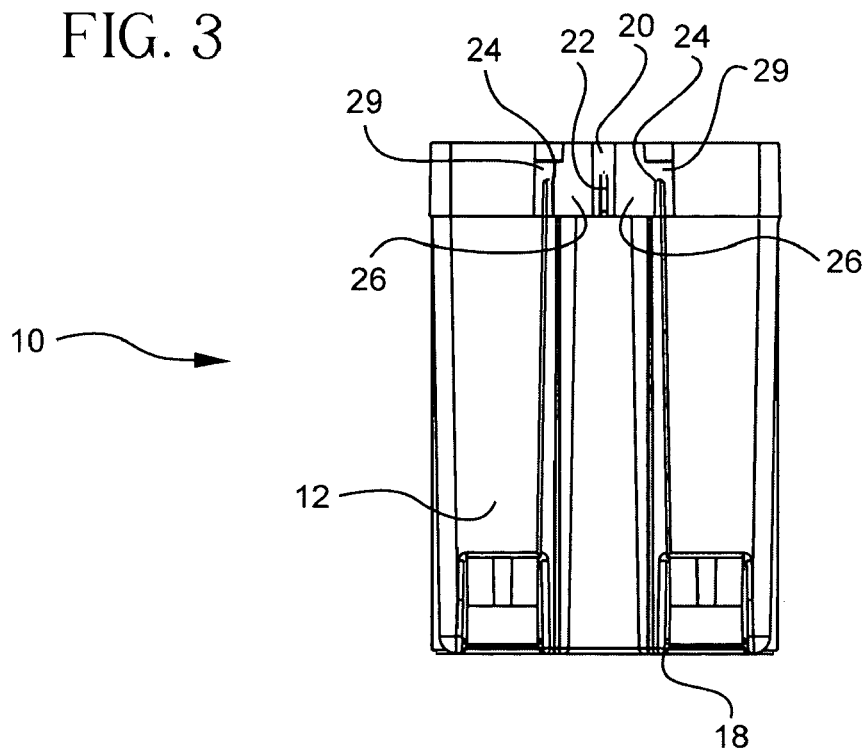
FIG. 3 is an exterior view of an end wall of the junction box taken along lines 3—3 of FIG. 1.

FIG. 3 shows an exterior view of the end wall 12 of the outlet box 10. The slot 22 in the socket 20 and the two substantially parallel side slots 24 define a pair of flexible tabs 26, which are connected to the two wall sections 28. When a mounting screw 92 (FIG. 10) is inserted in the fast set screw mounting socket 20, the two wall sections 28 and the tabs 26 are forced outwardly to accommodate the mounting screw 92. Once the mounting screw 92 has been inserted, the tabs 26 apply an opposite force against the threads 94 of the screw 92 (FIG. 9) to secure the screw 92 in place.

Figure 4:
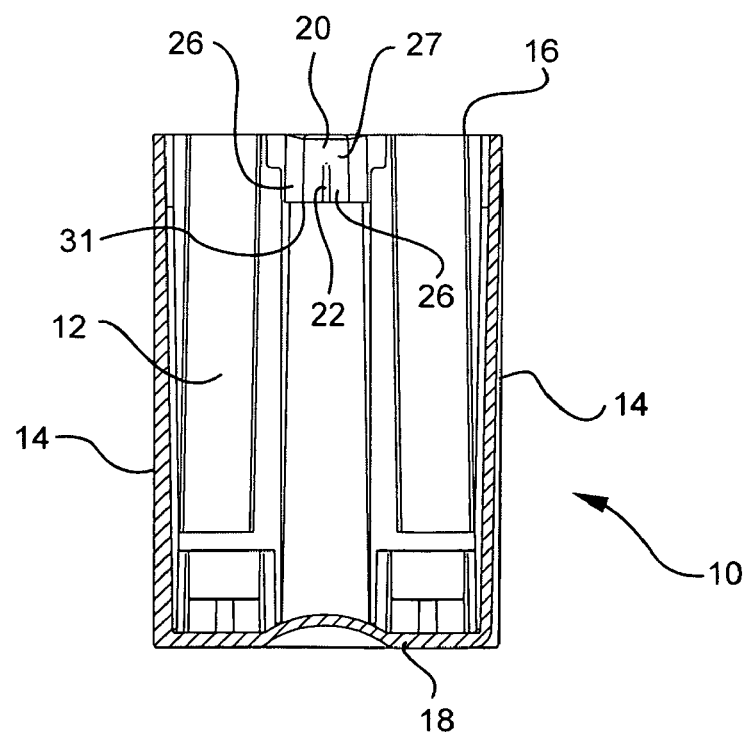
FIG. 4 is an interior view of an end wall of the junction box taken along lines 4—4 of FIG. 1.

FIG. 4 shows a view of the interior surface of the end wall 12 with opposing side walls 14. The mounting socket 20 extends inwardly from the interior surface of the end wall 12 and downwardly from the front opening 16 to the slit 31. The slot 22 in the mounting socket 20 divides the socket wall 27 into two opposing wall sections 28 which are connected to tabs 26 and provide flexibility when a mounting screw 92 (FIG. 10) is inserted into the fast set screw mounting socket 20.

Figure 5:
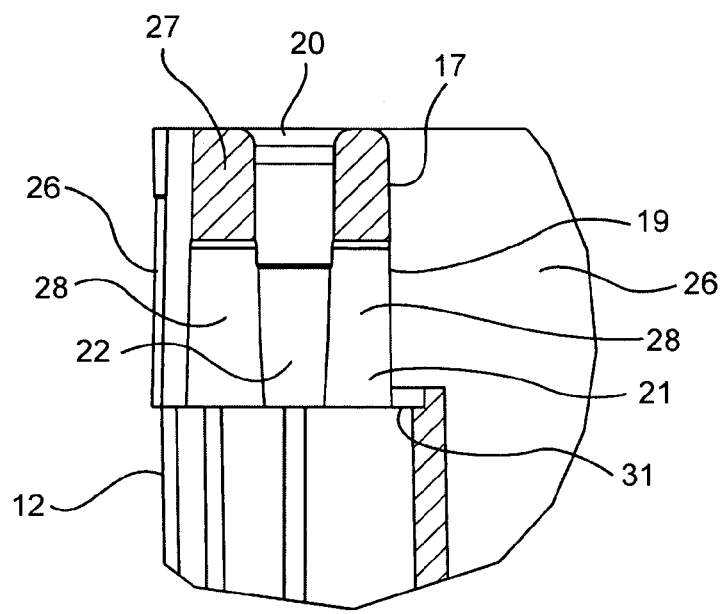
FIG. 5 is a cross-sectional view of a fast set screw mounting socket taken along lines 5—5 of FIG. 1.

A detail view of the fast set screw mounting socket 20 is shown in FIG. 5 with center slot 22 extending through the wall 27 of the socket 20. As shown, the socket 20 preferably tapers inwardly beginning at a mid-region 19 of the socket 20. When a screw (FIG. 11) is inserted in the fast set screw mounting socket 20, it encounters more resistance as it is pushed further into the socket 20. At the mid-region 19 where center slot 22 begins, the screw 92 more forcibly engages the socket wall sections 28 and starts to force aside the opposing tabs 26 connected to the wall sections 28. The tabs 26, which are thus pushed outwardly toward side walls 14 due to the taper of socket 20, provide the biasing force that engages the threads of the mounting screw and secures it in place. Looking at FIG. 8, each tab 26 can be said to pivot about a hinge section 29 of the end wall 12, which is adjacent to each side slot 24. Hence, while center slot 22 increases in width in order to accommodate a screw 92, the width of side slots 24 decreases as the tabs 26 flex outwardly from the center slot 22.

Figure 6:
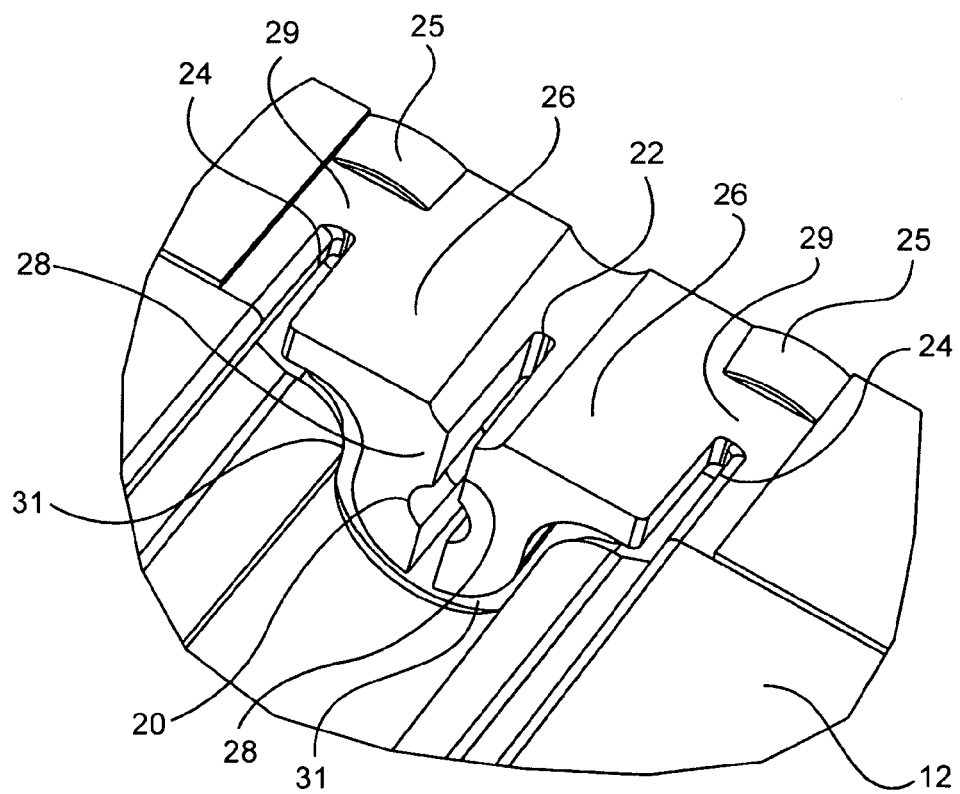
FIG. 6 is a perspective view of the exterior surface of an end wall and the rear end of a fast set screw mounting socket.

FIG. 6 shows how the side slots 24 allow the tabs 26 and wall sections 28 to flex outwardly when a screw 92 is inserted into the socket 20. The force exerted by the screw 92 on the socket wall sections 28 is transferred to the tabs 26 and then to the hinge sections 29 which connect the tabs 26 to the end wall 12. When the threads 94 of the screw 92 contact the walls sections 28, the adjoining tabs 26 flex to accommodate the screw 92. The tabs 26 also transfer an opposite biasing force to the screw 92 through the wall sections 28. In preferred embodiments, support members 25 can be included to provide the hinge sections 29 with added strength.

Figure 7:
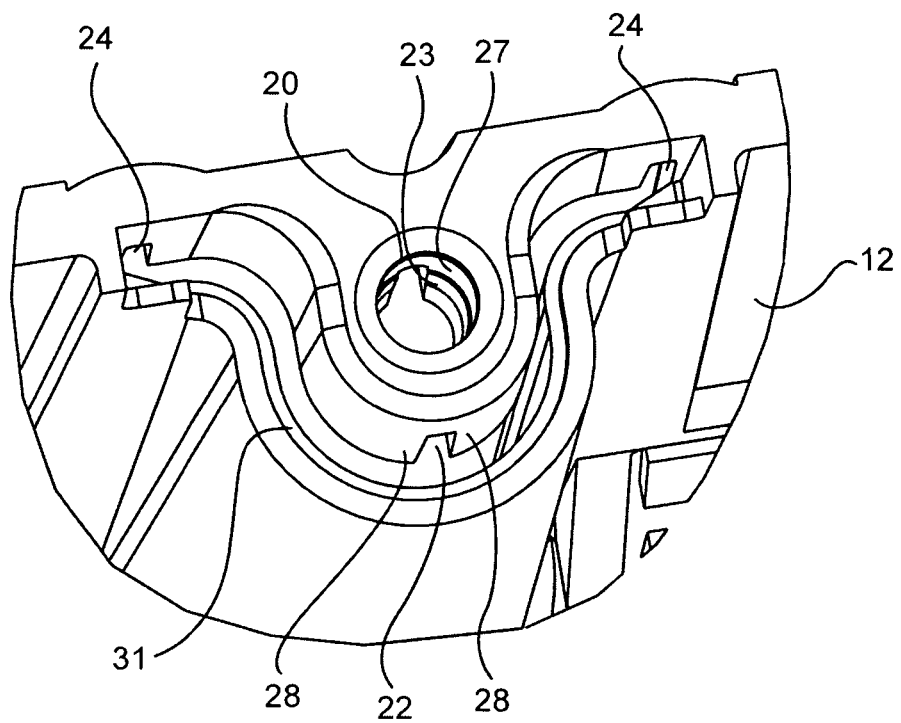
FIG. 7 is perspective view of the front side of a fast set screw mounting socket.

FIG. 7 shows the socket 20 extending downwardly from the end wall 12 and inwardly from the open end 16 of the box 10. The socket wall 27 can have a plurality of rings or grooves 23 that engage the threads 94 of a screw 92. The wall sections 28 flex outwardly as the screw 92 is inserted into the socket 20 and then move inwardly when the threads 94 are seated in the grooves 23. When a screw 92 is removed from a socket 20, the wall sections 28 move inwardly after the screw 92 is extracted.

Figure 8:
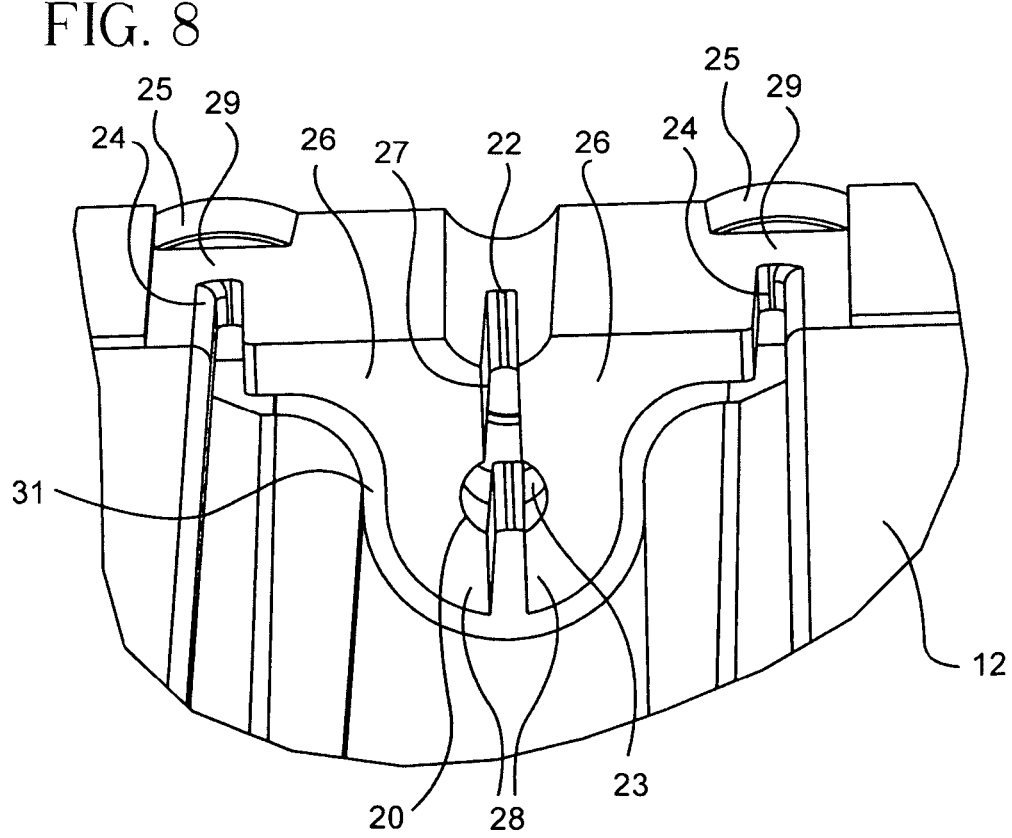
FIG. 8 is perspective view of the rear end of a fast set screw mounting socket.

FIG. 8 shows a view of the interior side of the end wall 12 with the socket 20 and tabs defined by slit 31 in the end wall 12. The slot 22 in the socket wall 27 extends from the midpoint of the socket 20 to the rear and forms two socket wall sections 28. The combination of the hinge sections 29 and tabs 26 on either side of the socket 20 allow the socket wall sections 28 to flexibly accommodate a screw 92. Once the screw 92 is inserted in the socket 20, the hinge sections 29 and tabs 26 provide an opposing force on the screw 92 to secure it in the socket 20. Note that the bottom of each tab 26 is separated from box 10 by a slit 31, which together with hinge section 29 enables the tab 26 to flex as described.

Figure 9:
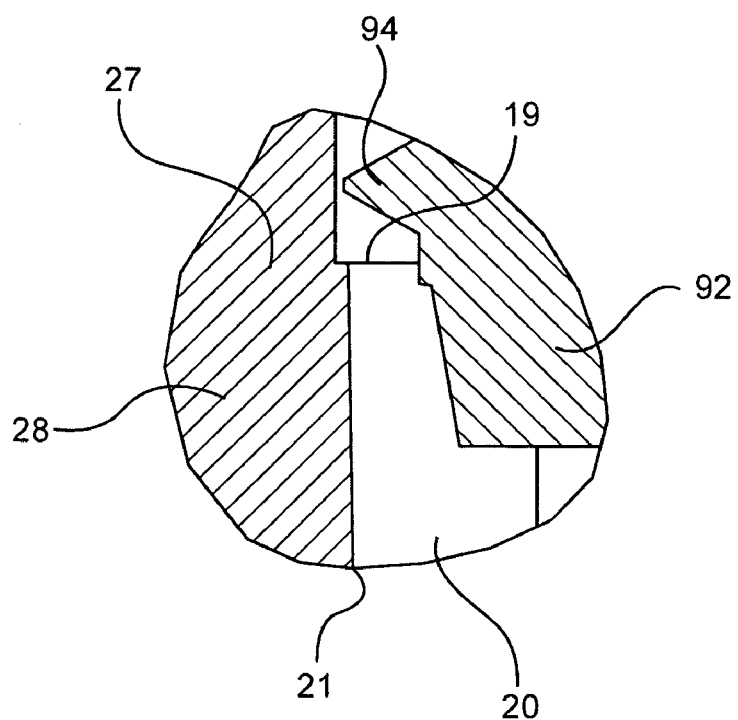
FIG. 9 is a cross-sectional view of a portion of the mounting screw in the fast set screw mounting socket.

FIGS. 9–12 show a mounting screw 92 inserted in the fast set screw mounting socket 20 in preparation for securing a receptacle 90 in the outlet box 10. FIG. 9 is a detail view of the fast set screw mounting socket 20 showing the threads 94 of the mounting screw 92 just before they engage walls sections 28. In preferred embodiments, the wall 27 of the mounting socket 20 is tapered inwardly to permit the installer to partially insert a screw 92 into the socket 20. FIG. 9 shows the screw 92 at the point where the thread 94 begins to engage the interior surface of the socket wall section 28. As the screw 92 moves past the mid-region 19 of the socket 20, the wall section 28 tapers inwardly. In preferred embodiments, the socket walls 27 begin to taper inwardly at the mid-region 19 and continuing to the rear end 21 of the socket 20. However, the tapering can begin at any point along the socket wall 27.

Figure 10:
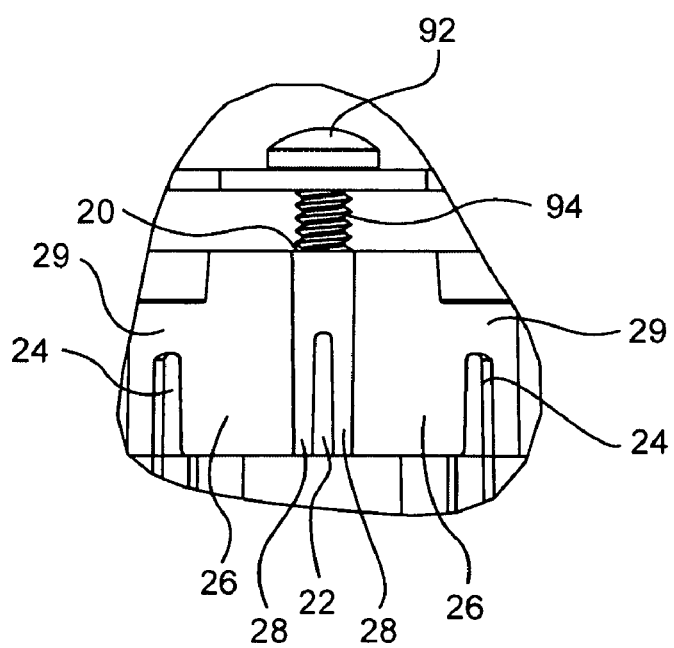
FIG. 10 is a cross-sectional side view of the fast set screw mounting socket with a mounting screw partially inserted in the socket.

FIG. 10 is a side view of the end wall 12 of the outlet box 10 and shows a mounting screw 92 securing a receptacle 90 to the outlet box 10. The end wall 12 has a mounting socket 20 with a center slot 22 and two side slots 24. When the screw 92 is inserted into the mounting socket 20, center slot 22 and the side slots 24 act in cooperation to provide tabs 26 with flexibility. The tabs 26 flex about hinge section 29 (as is now permitted by side slots 24) and the center slot 22 expands as side slots 24 close when the screw 92 is inserted.

Figure 11:
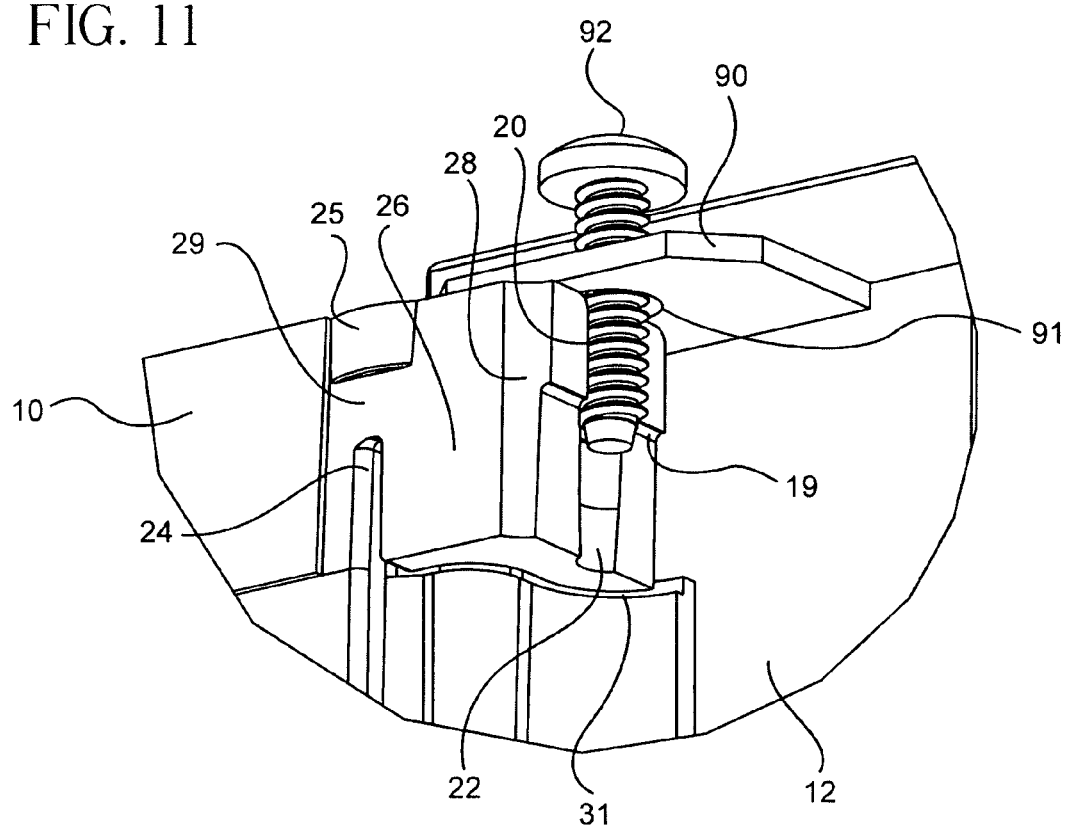
FIG. 11 is a cross-sectional perspective view of the fast set screw mounting socket with the mounting screw partially inserted in the socket.

FIG. 11 is a perspective, cut away view of the end wall 12 with a mounting socket 20, a center slot 22 and a wall section 28 formed therein. A receptacle 90 is mounted in an outlet box 10 by inserting a mounting screw 92 through an aperture 91 in the receptacle 90 and then into the mounting socket 20. FIG. 11 shows the screw 92 inserted to about the mid-region 19 of the socket 20 where the mounting socket 20 tapers inwardly. The installer pushes the screw 92 into the mounting socket 20 and, as it passes the mid-region 19, the threads 94 of the screw 92 begin to assert a force on the mounting wall sections 28 on the opposing sides of the slot 22. The wall sections 28 are attached to the tabs 26 and flexibly oppose the insertion of the screw 92.

Figure 12:
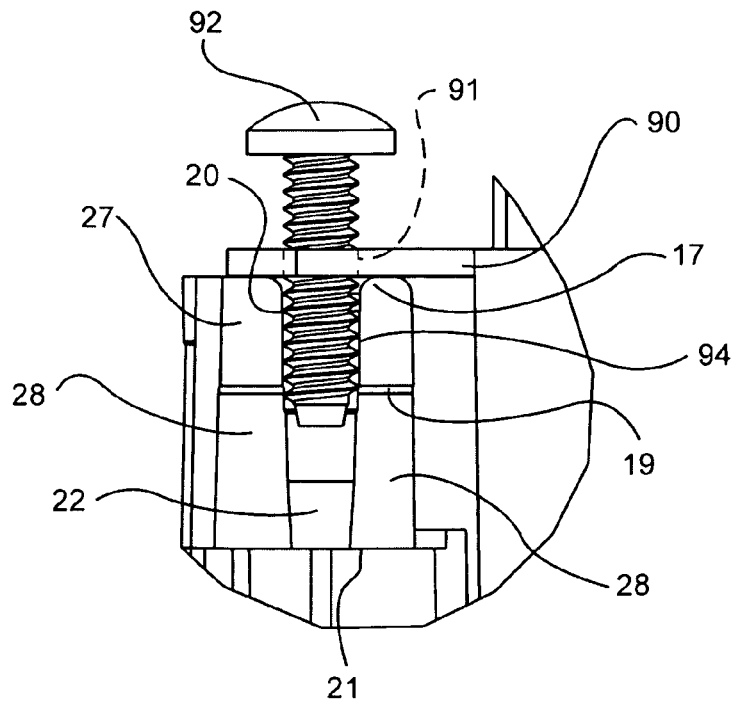
FIG. 12 is a cross-sectional side view of the fast set screw mounting socket with a mounting screw partially inserted in the socket.

FIG. 12 is a side view of the mounting socket in FIG. 11 and it illustrates how the mounting socket 20 tapers inwardly between the mid-region 19 and the rear end 21 of the socket 20. Between the first end 17 of the socket 20 and the mid-region 19, the threads 94 of the screw 92 are in contact with the socket wall 27, but the wall 27 provide only a slight force against the threads 94 of the screw 92. Below the mid-region 19, the slot 22 bisects the wall 27 into two wall sections 28, which taper inwardly. When the screw 92 is inserted past the mid-region 19, the threads 94 engage the wall sections 28 and the wall sections 28 flex outwardly to accommodate the screw 92. After the screw 92 is fully inserted in the socket 20, the wall sections 28 apply a force to the opposing sides of the screw 92 to secure it in the socket 20. The tab 26 flexes outwardly as the mounting socket walls sections 28 are pushed apart. The flexibility of the tab 26 is provided by the center mounting socket slot 22 and side wall slot 24 acting in cooperation. This creates a biasing force that secures the mounting screw 92 in the mounting socket 20. In preferred embodiments, the interior surface of the mounting socket 20 can have rings or grooves 23 that engage the threads 94 of the mounting screw 92.

FIG. 11 and FIG. 12 illustrate the push-in manner of installation using the fast set screw mounting sockets 20. A force parallel to the axis of the mounting socket 20 is applied to the mounting screw 92 to force it into the mounting socket 20. This action results in screw threads 94 engaging the slightly tapered interior surface of socket 20 and thereby deflecting the wall sections 28 outwardly. Because tabs 26 are connected to the wall sections 28, the insertion of the screw 92 results in a slight outward movement or rotation of tabs 26. Similarly, the width of the side slots 24 decreases, which enables the tabs 26 to flex about the hinge section 29. As a consequence, mounting socket 20 and particularly tab 26, now apply a slight bias to screw thread 94.

After the mounting screws 92 have been completely inserted into the mounting sockets 20, the bias of tabs 26 on threads 94 increases and prevents the receptacle 90 from being removed from the box 10. Attempting to remove the receptacle 90 from the box 10 causes the tabs 26 to move inwardly and further engage the thread 94. This increases the resistance on the screws 92 and maintains the receptacle 90 in place. Thus, while screws 92 are readily pushed into mounting sockets 20, they cannot be easily removed in a like manner.

Figure 13:
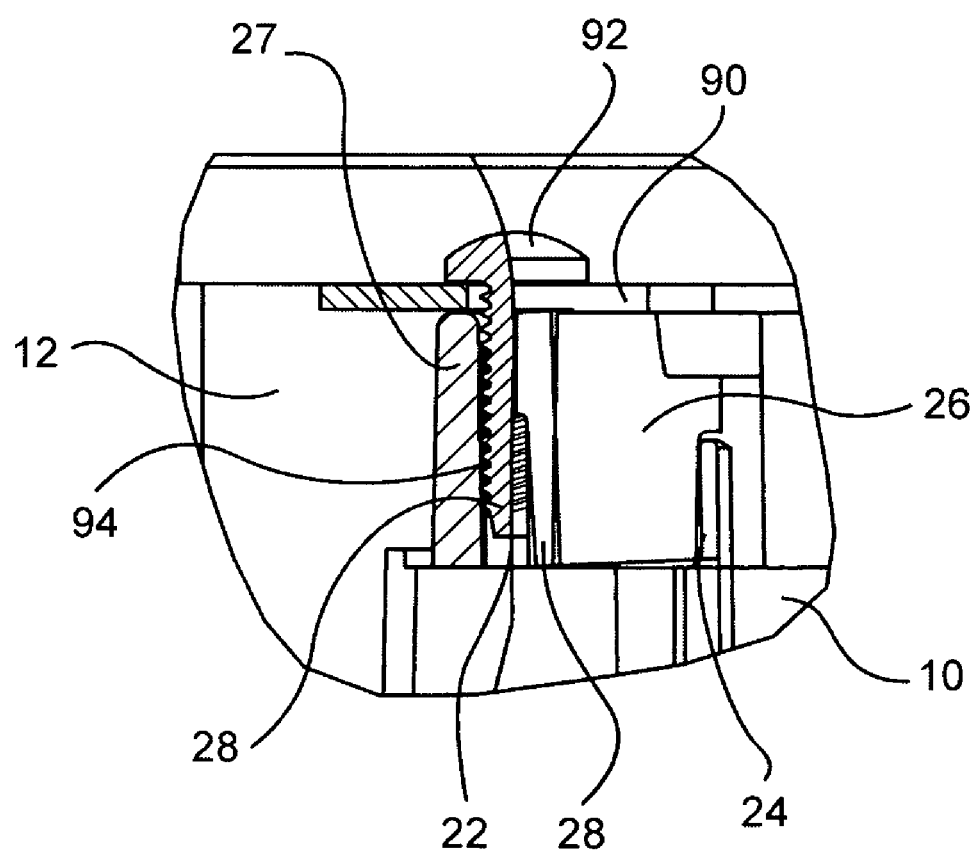
FIG. 13 is a detail view, partially cut away, of the fast set screw mounting socket with a mounting screw fully inserted in the socket.

FIG. 13 is a side view of the end wall 12 of the outlet box 10 and shows a cross-sectional view of the left half of the fast set screw mounting socket 20 with a mounting screw 92 securing a receptacle 90 in the box 10. The tapered shape of the mounting socket wall 27 results in the mounting screw 92 encountering increased resistance as it is inserted further into the mounting socket 20. When the mounting screw 92 is inserted in the mounting socket 20, the biasing force created on the threads 94 of the screw 92 due to the mounting socket wall slot 22 and the side slots 24 tightly secures the screw 92 in position. The mounting screw 92 can be inserted either by pushing the screw 92 into the mounting socket 20 or it can be pushed part way into the mounting socket 20 and the installation can be completed by turning/rotating the screw 92 with a screwdriver. To remove screw 92, the user need simply unthread the screw from the mounting socket 20.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. A non-metallic electrical wiring box having a fast set screw mounting socket for mounting electrical devices to the box, wherein the box comprises:
   a pair of end walls;
   a front opening; and
   one or more fast set screw mounting sockets in each end wall or connected to each end wall for receiving a mounting screw, wherein each socket comprises:
      a socket wall;
      an interior wall surface, and
      a first end, a second end and a mid-region, wherein the first end corresponds to the front opening and the mid-region is between the first and second ends; and
      a center slot in the socket wall, the center slot extending from about the mid-region to the second end and defining two flexible socket wall sections;
   wherein the first end of the mounting socket receives a mounting screw having threads and the flexible socket wall sections flexibly accommodate the screw.

2. The non-metallic electrical wiring box according to claim 1, wherein the one or more fast set screw mounting sockets are at least partially tapered toward the second end.

3. The non-metallic electrical wiring box according to claim 1, wherein the box further comprises a pair of side slots in each end wall, wherein the fast set screw mounting socket is disposed between the side slots.

4. The non-metallic electrical wiring box according to claim 3, wherein the side slots are substantially parallel to the center slot.

5. The non-metallic electrical wiring box according to claim 3, wherein the second end of each socket is defined by a slit in the end wall.

6. The non-metallic electrical wiring box according to claim 5, wherein the slit is substantially perpendicular to the center slot.

7. The non-metallic electrical wiring box according to claim 5, wherein the side slots are substantially parallel to the center slot.

8. The non-metallic electrical wiring box according to claim 1, wherein the second end of each socket is defined by a slit in the end wall.

9. The non-metallic electrical wiring box according to claim 8, wherein the slit extends between the side slots and is substantially perpendicular to the center slot.

10. The non-metallic electrical wiring box according to claim 1, wherein the interior wall surface is substantially smooth.

11. The non-metallic electrical wiring box according to claim 1, wherein the interior wall surface has a plurality of grooves.

12. A non-metallic electrical wiring box having a fast set screw mounting socket for mounting electrical devices to the box, wherein the box comprises:
   a pair of end walls;
   a front opening;
   one or more fast set screw mounting sockets in each end wall or connected to each end wall, wherein each socket comprises:
      a mounting socket wall,
      an interior wall surface,
      a first end, a second end and a mid-region, wherein the first end corresponds to the front opening and the mid-region is between the first and second ends, and
      a center slot in the mounting socket wall, the center slot extending from about the mid-region to the second end and defining two flexible socket wall sections; and
   a pair of side slots in each end wall, wherein the fast set screw mounting socket is disposed between the side slots;
   a slit in each end wall which defines the second end of the fast set screw mounting socket and is substantially parallel to the front opening; and
   a pair of tabs in each end wall located between the center slot and the side slots,
   wherein the first end of the mounting socket receives a mounting screw having a plurality of threads and the flexible wall sections flexibly accommodate the screw.

13. The non-metallic electrical wiring box according to claim 12, wherein the first end of the fast set screw mounting socket has a first diameter and the second end has a second diameter, and wherein the first diameter is greater than the second diameter.

14. The non-metallic electrical wiring box according to claim 12, wherein the end walls have interior sides and the sockets are connected to the interior sides.

15. The non-metallic electrical wiring box according to claim 12, wherein the side slots are substantially parallel to the center slot.

16. The non-metallic electrical wiring box according to claim 12, further comprising a pair of hinge sections which connect the pair of tabs to the each end wall.

17. The non-metallic electrical wiring box according to claim 12, wherein the interior wall surface has a plurality of grooves.

18. A non-metallic electrical wiring box having a fast set screw mounting socket for mounting electrical devices to the box, wherein the box comprises:
- a pair of end walls;
- a front opening;
- one or more fast set screw mounting sockets either in or connected to each of the end walls, wherein each socket comprises:
  - an interior wall surface,
  - a first end, a second end and a mid-region, wherein the first end corresponds to the front opening and the mid-region is between the first and second ends; and
  - a center slot bisecting the mounting socket wall and extending from about the mid-region to the second end and defining two or more flexible socket wall sections;
- a pair of side slots in each end wall, wherein the fast set screw mounting socket is disposed between the side slots;
- a slit in the end wall which defines the second end of the fast set screw mounting socket and is substantially parallel to the front opening, wherein the center slot and the side slots are substantially parallel and extend to the slit; and
- a pair of hinge sections in each end wall which allow two of the flexible mounting socket wall sections to pivot outwardly,
- wherein the first end of the mounting socket receives a mounting screw having threads and the flexible wall sections flexibly accommodate the screw.

19. The non-metallic electrical wiring box according to claim 18, wherein the mounting socket is at least partially tapered from the first end to the second end.

20. The non-metallic electrical wiring box according to claim 18, wherein the interior wall surface has a plurality of grooves.

* * * * *